United States Patent
Beaupre et al.

(10) Patent No.: US 12,119,141 B2
(45) Date of Patent: Oct. 15, 2024

(54) SYSTEM AND METHOD FOR DIELECTRIC COATED BUSBARS

(71) Applicant: DANA TM4 INC., Boucherville (CA)

(72) Inventors: Marc-Antoine Beaupre, Saint-Lambert (CA); Francois Dube, Montreal (CA); Luke Miller, Montreal (CA); Cristian Campean, St. Hubert (CA)

(73) Assignee: DANA TM4 INC., Boucherville (CA)

( * ) Notice: Subject to any disclaimer, the term of this patent is extended or adjusted under 35 U.S.C. 154(b) by 874 days.

(21) Appl. No.: 16/844,808

(22) Filed: Apr. 9, 2020

(65) Prior Publication Data

US 2021/0319933 A1  Oct. 14, 2021

(51) Int. Cl.
  *H01B 19/04* (2006.01)
  *H01B 7/42* (2006.01)
  *H01B 13/16* (2006.01)
  *H02G 5/10* (2006.01)

(52) U.S. Cl.
  CPC ............. *H01B 19/04* (2013.01); *H01B 7/426* (2013.01); *H01B 7/428* (2013.01); *H01B 13/16* (2013.01); *H02G 5/10* (2013.01)

(58) Field of Classification Search
  CPC ........ H01B 19/04; H01B 13/16; H01B 13/00; H02G 5/10; H02M 7/003
  See application file for complete search history.

(56) References Cited

U.S. PATENT DOCUMENTS

| | | | |
|---|---|---|---|
| 6,714,414 B1 | 3/2004 | Dubovsky et al. | |
| 7,819,681 B1 * | 10/2010 | Rodrigues | H02G 5/007 |
| | | | 174/88 B |
| 11,511,636 B2 * | 11/2022 | Mathews | B60L 53/302 |
| 2004/0069527 A1 | 4/2004 | Vanhoutte et al. | |
| 2010/0091501 A1 * | 4/2010 | Tan | H05K 1/0204 |
| | | | 313/46 |
| 2013/0003265 A1 * | 1/2013 | Rodrigues | H02G 5/06 |
| | | | 361/675 |
| 2013/0043071 A1 * | 2/2013 | Subramaniam | H02G 5/10 |
| | | | 174/70 B |
| 2014/0116617 A1 * | 5/2014 | Walgenbach | H02G 5/06 |
| | | | 156/295 |
| 2014/0125439 A1 * | 5/2014 | Esseghir | C08G 59/686 |
| | | | 336/61 |
| 2014/0185194 A1 | 7/2014 | Mills et al. | |
| 2018/0206359 A1 * | 7/2018 | McPherson | H02M 7/003 |
| 2018/0288907 A1 | 10/2018 | Richards | |
| 2019/0305526 A1 | 10/2019 | Velthuis et al. | |

(Continued)

FOREIGN PATENT DOCUMENTS

| | | | | |
|---|---|---|---|---|
| BR | 102015006552 A2 * | 12/2015 | ......... | H01L 23/3735 |
| DE | 102005015945 A1 | 10/2006 | | |

(Continued)

*Primary Examiner* — Jeffrey T Carley
*Assistant Examiner* — Jose K Abraham
(74) *Attorney, Agent, or Firm* — McCoy Russell LLP

(57) ABSTRACT

Methods and systems for a dielectric material coated busbar are provided. In one example, a conductive material may be formed into a shape of a busbar and portions of the busbar may be selectively coated with a dielectric material which may be both electrically insulating and thermally conductive. The dielectric coated portions of the busbar may dissipate heat to a heat sink via a thermal interface material compressed on the busbar.

12 Claims, 4 Drawing Sheets

(56) References Cited

U.S. PATENT DOCUMENTS

| | | | |
|---|---|---|---|
| 2020/0136326 A1* | 4/2020 | Rai | H01H 50/12 |
| 2020/0194988 A1* | 6/2020 | Wakabayashi | H01R 43/16 |
| 2020/0205319 A1* | 6/2020 | Pouilly | H05K 7/14329 |
| 2020/0313328 A1* | 10/2020 | Mathews | H01R 13/35 |
| 2020/0328026 A1* | 10/2020 | Nguyen | H01G 4/38 |
| 2021/0021077 A1* | 1/2021 | Mathews | H01R 13/5202 |

FOREIGN PATENT DOCUMENTS

| | | | |
|---|---|---|---|
| DE | 102018110313 A1 | * | 10/2019 |
| KR | 20180066866 A | * | 6/2018 |
| WO | 2016183691 A1 | | 11/2016 |
| WO | 2018191817 A1 | | 10/2018 |

* cited by examiner

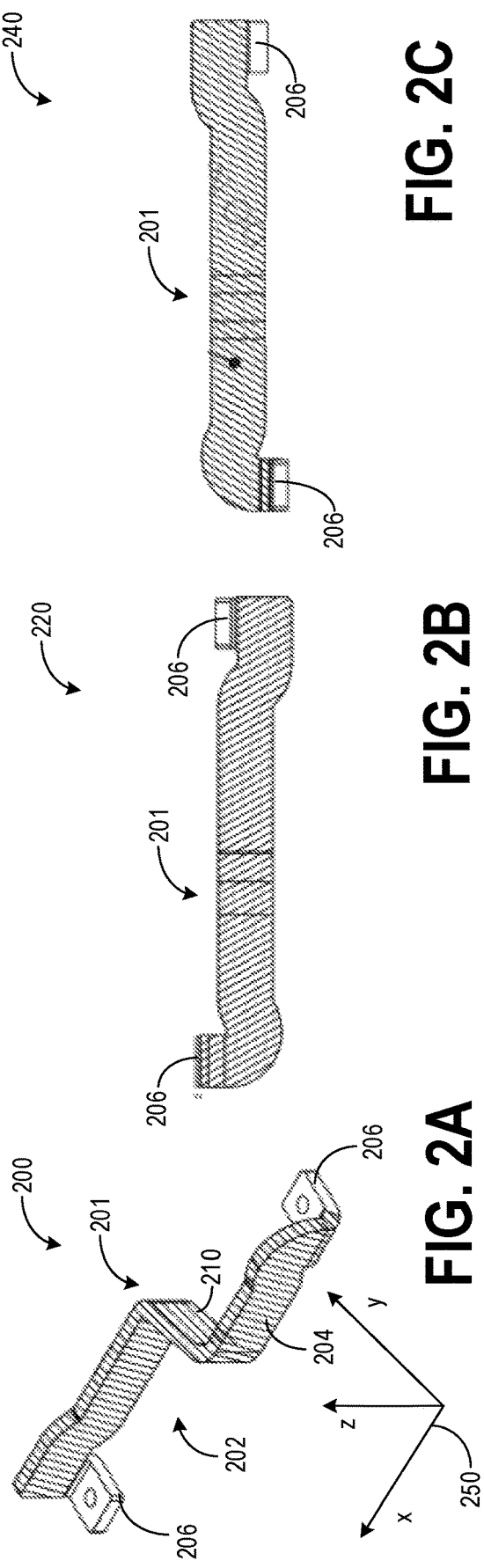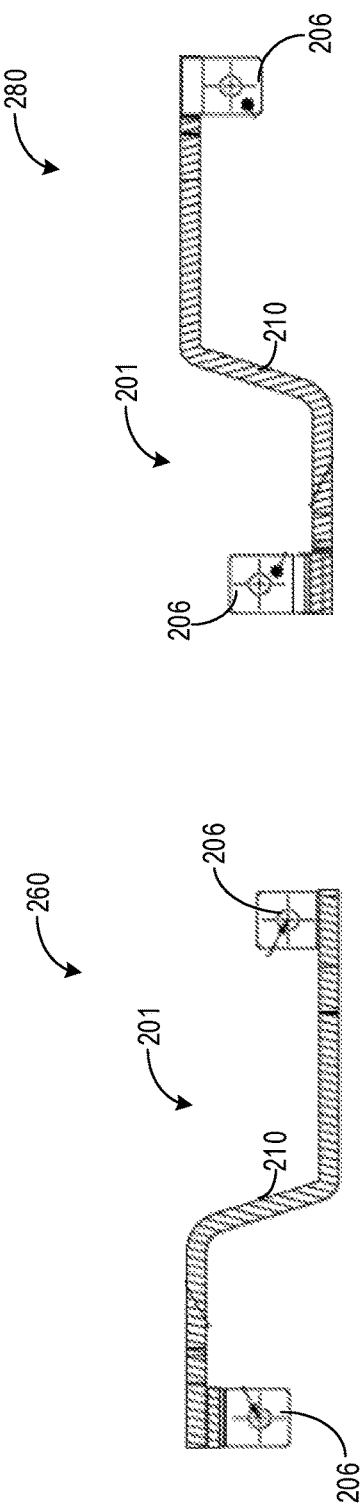

SYSTEM AND METHOD FOR DIELECTRIC COATED BUSBARS

FIELD

The present disclosure relates to a system and method for dielectric coated busbars. The system and method may be applicable to fabrication of dielectric coated busbars used in an inverter system.

BACKGROUND AND SUMMARY

Busbars may be used in power distribution systems to transmit current where a wiring scheme is infeasible. A busbar is a conductive material distributing electric power from a supply point to numerous output circuits. Used in a variety of configurations, busbars can come in a multitude of shapes and sizes such as solid bars, flat strips, or rods, and are commonly composed of copper, aluminum, or brass. Their cross-sectional size and material composition determine the amount of current that can be carried by the busbar.

The current-carrying capacity of any busbar is limited by the maximum working temperature of the system, which is related to the thermal management of the system. Cooling of busbars facilitate increased power density, which is desirable for power electronics. High-frequency applications of a busbar such as in an inverter cause a significant amount of heat to be generated. In the absence of adequate cooling, busbars may overheat causing degradation of the overall system.

A portion of the busbar may be covered, such as by overmolding, by an insulating material such as a polymer to protect the conductive portion of the busbar from being contacted by an extraneous object that may cause an electrical short circuit. However, due to the lower thermal conductivity of the electrically insulating material, heat dissipation from the busbar assembly may be adversely affected, thereby reducing the power density of the assembly. Further, the increased thickness of the overmolded insulating material may further decrease thermal performance of the busbar assembly. A thicker overmolded material may cause an increase in size of the busbar system which may lead to packaging concerns.

The inventors herein have recognized the above-mentioned issues and have developed a method for a high voltage busbar, comprising: forming a conductor into a shape of the busbar, coating unmasked areas of the busbar with a dielectric material to form a dielectric coated portion of the busbar, and compressing the dielectric coated portion of the busbar to a thermal interface material (TIM) attached to a heat sink. In this way, by forming a powder coated dielectric busbar and using a thermal interface material, heat dissipation to a heat sink may be improved.

As an example, a busbar may be formed from a metal such as copper. A portion of the busbar to remain uncoated may be masked and a powder coating may be applied to a remaining, unmasked, portion of the busbar. A powder material used for the coating may be a dielectric material exhibiting electrical insulation while being thermally conductive. The busbar may then be installed in a component such as an inverter with the dielectric coated portion of the busbar being compressed on to a TIM via a pressure part. The TIM may be attached to a heat sink for heat dissipation from the busbar.

In this way, by replacing a thicker thermally insulating polymer material with a thinner dielectric powder coating, cooling of busbars may be expedited. By using a powder, increased flexibility may be available when coating irregular shapes including bends and curves in a busbar. The lower thickness of the busbar assembly may further facilitate in packaging of the busbar within the component. The technical effect of using a thermal interface material compressed onto the busbar with a pressure part as an interface between the busbar and a heat sink is that heat dissipation may be improved. Overall, by coating the busbar with a material that is electrically insulating while being thermally conductive, operation of the busbar may be improved due to improved thermal management and power density.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 2A shows a perspective view of a busbar coated with a dielectric powder material.

FIG. 2B shows a front view of the busbar of FIG. 2A.

FIG. 2C shows a rear view of the busbar of FIG. 2A.

FIG. 2D shows a top view of the busbar of FIG. 2A.

FIG. 2E shows a bottom view of the busbar of FIG. 2A.

DETAILED DESCRIPTION

Figure 1:
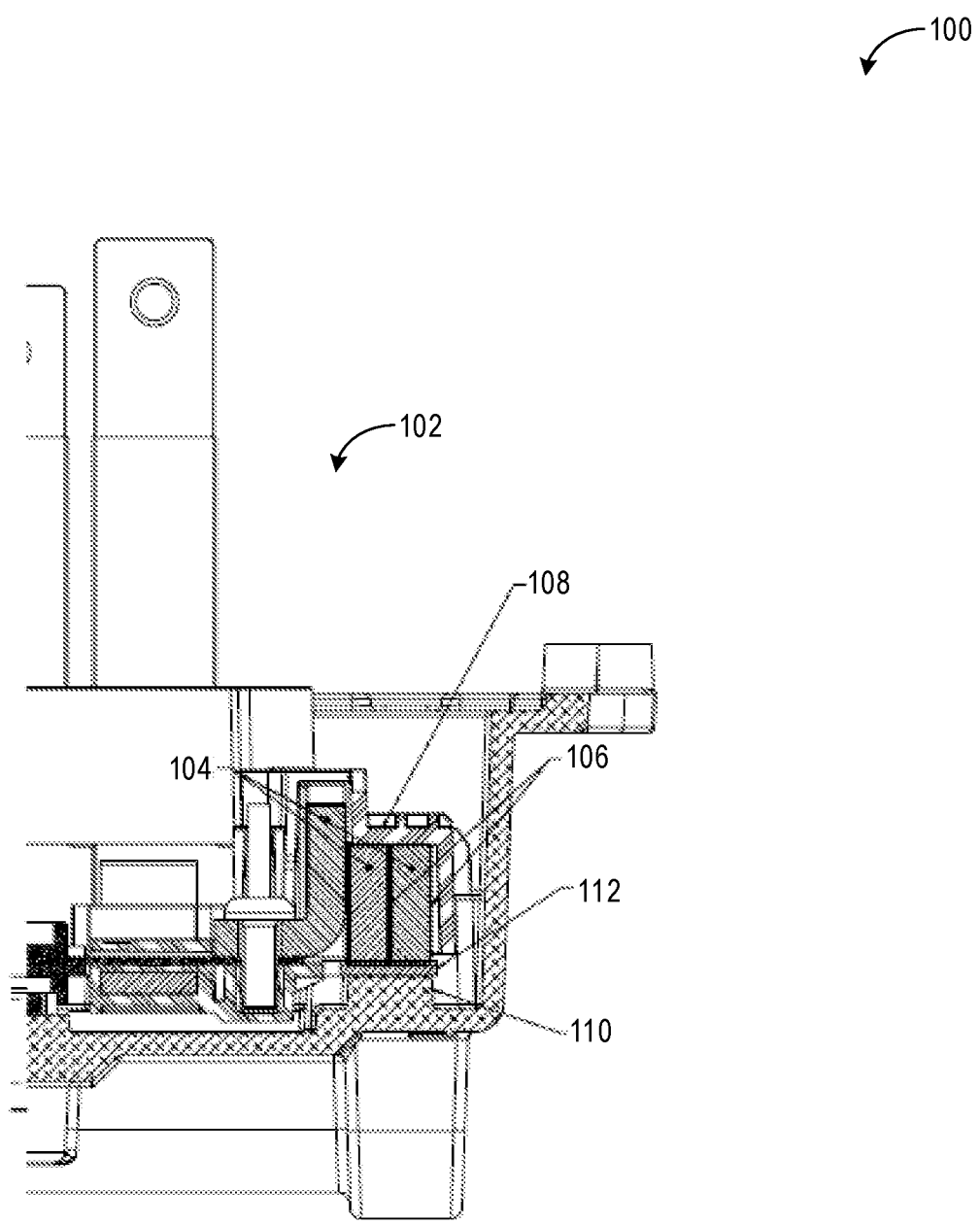
FIG. 1 shows a cross-section of a portion of an inverter including a plurality of busbars.
Figure 3:
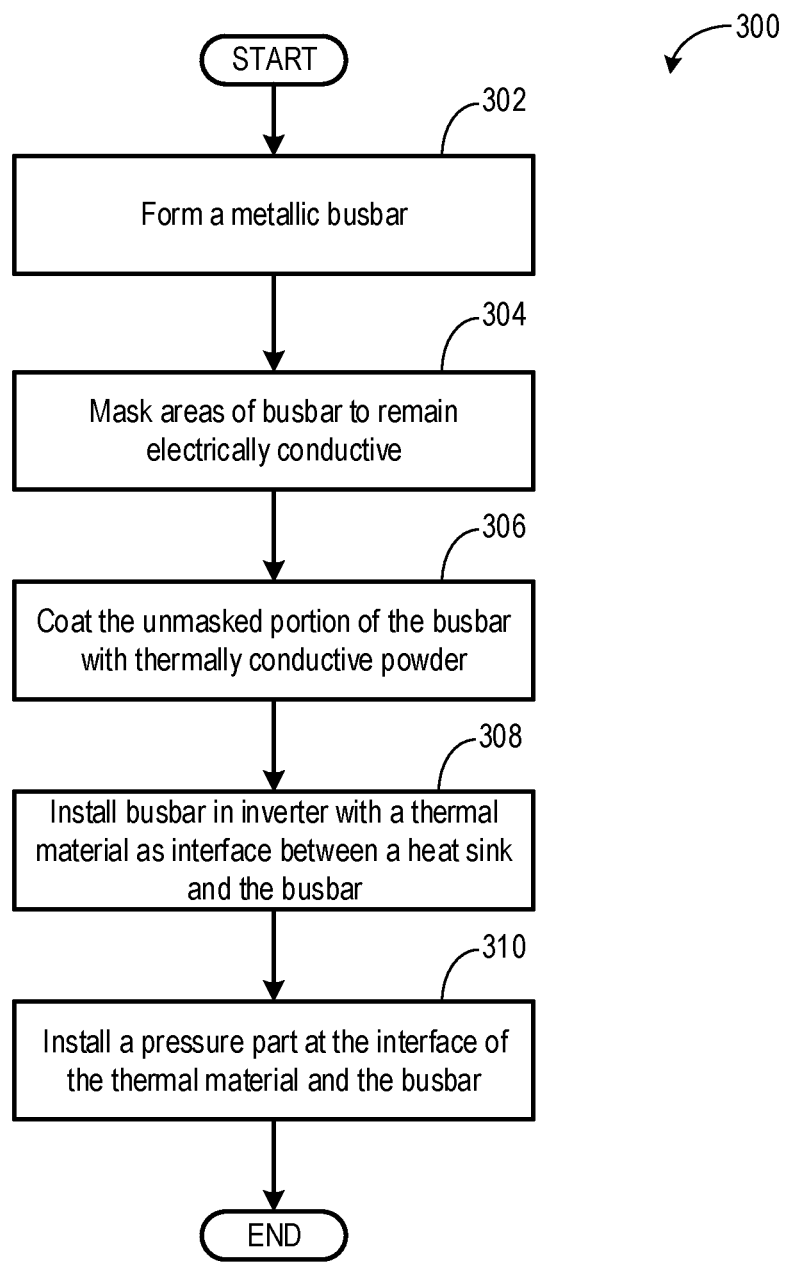
FIG. 3 shows an example method for fabrication of a busbar coated with a dielectric powder material.
Figure 4:
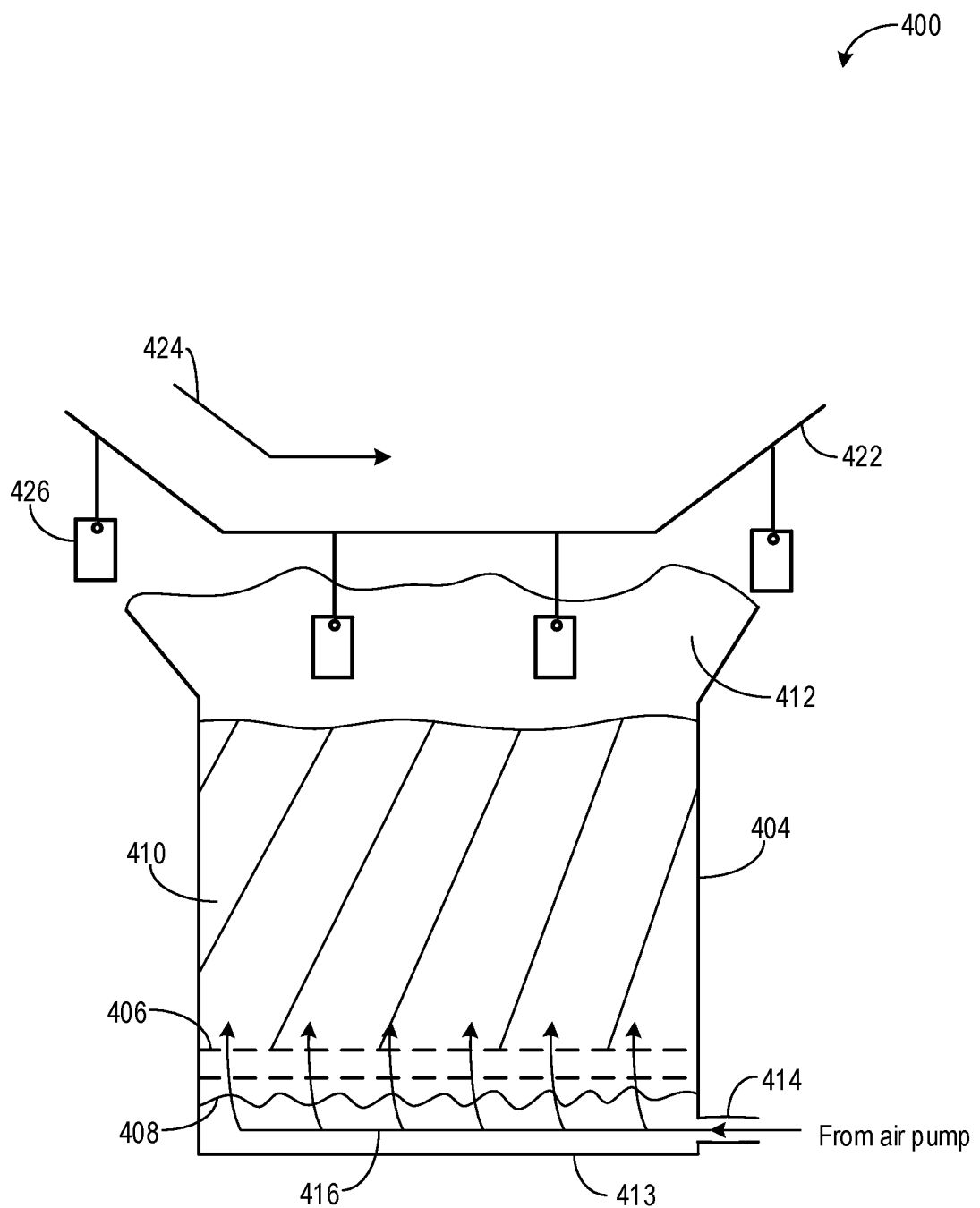
FIG. 4 shows a schematic of an example setup for an electrostatic fluidized bed powder coating process.

The following description relates to systems and methods for fabrication of busbars coated with a dielectric powder material. The powder coating on the busbars may provide electrical insulation while being thermally conductive for expedited heat dissipation. Such powder coated busbars may be used in high-frequency applications such as in an inverter. FIG. 1 shows an example cross-section of an inverter including a plurality of busbars arranged for improved thermal management. Different views of a powder coated busbar are shown in FIGS. 2A-2E. A method for fabrication of powder coated busbars and incorporation of such busbars in an assembly, such as an inverter system, is discussed in FIG. 3. Accordingly, FIG. 4 depicts an example electrostatic fluidized bed powder coating process used for coating the busbars with a dielectric powder material.

FIG. 1 shows an example cross-section 100 of an inverter 102 including a plurality of busbars 104. In one example, the inverter 102 may be used in a propulsion source of a vehicle. The propulsion source may be an electric motor providing torque to propel the vehicle. The propulsion source may consume alternating current (AC) electrical power provided via the electrical inverter. Alternatively, propulsion source may provide AC electrical power to the inverter. The electrical power inverter may be provided with high voltage direct current (DC) power from an electrical energy storage device (e.g., a traction battery or a traction capacitor). An inverter may convert the DC electrical power from electrical energy storage device into AC electrical power for the propulsion source. Alternatively, the inverter may be provided with AC power from the propulsion source. The inverter may convert the AC electrical power from the propulsion source into DC power to be stored in an electrical power storage device.

An inverter may include an insulated Gate Bipolar Transistor (IGBT) and a silicon diode. These power components are mounted (such as soldered) on Direct Bond Copper (DBC) substrates, which comprise copper layers with an insulating ceramic layer sandwiched in between. Wire bonds or other interconnects may be used to provide electrical connectivity between a busbar and the various die, where the busbar provides electrical communication with external systems.

A busbar used in an inverter may be one of an alternating current (AC) busbar and a direct current (DC) busbar. A size of the busbar may vary based on if the busbar is sued to conduct direct current or alternating (phase) current. As an example, electrical connections may be made between power devices and AC busbars using wire bondings or the like. During operation, these power devices in combination transform DC signals received through positive and negative DC busbars to a single-phase AC output signal transferred through an AC busbar to an AC system such as an electric drive motor of the vehicle propulsion system. Due to operation of the power devices, the busbars are heated and a heat dissipation system is desired for expedited cooling of the busbars. By maintaining temperature of busbars within a threshold level, power density of the setup may be improved.

In the cross-section 100 of the inverter 102, three AC busbars 104 are seen in contact with power devices. Each busbar 104 is metallic such as made of copper, aluminum, or a copper alloy. A busbar 104 may include a solid metallic body and one or more external connection portions. The busbar is coupled to the power devices via the external connection portions. The surface of the body of the busbar (excluding the external connection portions) may be covered via an electrically insulating material to protect the conductive portion of the busbar from being contacted by an extraneous object that may cause an electrical short circuit with grounded components (such as a grounded heat sink). In order to maintain thermal conductivity of the body of the busbar while being electrically insulating, the body of the busbar may be coated with a dielectric powder. The thickness of the dielectric powder coating 106 may be significantly lower (such as less than half) than other forms of electrical insulation used (such as over molded polymer) which may further improve thermal management of the busbar. An example busbar coated with a dielectric powder is shown in FIGS. 2A-2E.

A heat sink 110 is provided adjacent to the busbars 104 for dissipation of heat from the busbar. A cooling fluid may be circulated through the heat sink which may adsorb heat from the busbar and other adjacent components. After flowing through the heated components of the inverter, the cooling fluid may flow to a heat dissipation component where the collected heat may be dissipated from the cooling fluid to the atmosphere. In order to improve heat dissipation, an interface between each bus bar 104 and the heat sink 110 may be lined with a thermal interface material (TIM) 112. The TIM may be a thermally conductive material which may effectively conduct heat from the busbar to the heat sink, thereby decreasing the temperature of the busbar efficiently. Examples of thermal interface materials include silicone, reinforced silicone (such as with fiberglass), reinforced polymer, etc. In order to improve contact between the busbar and the heat sink via the TIM, a pressure part 108 may be positioned on the busbar to exert pressure on the TIM between the busbar and the heat sink. Due to the exerted pressure, the respective contacts between the busbar and TIM, and the TIM and the heat sink may be maintained without any air gaps in between. Due to the lower thermal conductivity of air, air gaps would have resulted in reduction of heat transfer from the busbars to the heat sink via the TIM. An example method for fabricating a coated busbar in thermal communication with a heat sink via a thermal interface material is elaborated in FIG. 3.

In this way, by coating the busbars with a thermally conductive yet electrically insulating material and then positioning the busbars in thermal contact with a heat sink via a TIM using a pressure part, thermal management of the busbar systems may be improved in an inverter. An improved thermal management may provide a higher power density from the power components, thereby improving the efficiency of the inverter.

FIG. 2A-2E show a plurality of views of a busbar 201 coated with a dielectric powder. FIG. 2A shows a perspective view 200 of the busbar 201, FIG. 2B shows a front view 220 of the busbar 201, FIG. 2C shows a rear view 240 of the busbar 201, FIG. 2D shows a top view 260 of the busbar 201, and FIG. 2E shows a bottom view of the busbar 201. Busbar 201 may be an alternating current (AC) busbar or a direct current (DC) busbar. As an example, busbar 201 may be busbar 104 in FIG. 1. The busbar 201 may include a body 202 and two external connection portions 206 at each end of the body 202. The body 202 of the busbar may extend along the x-axis of the co-ordinate system 250 and the external connection portions 206 may extend along the y-axis. In other embodiments, a busbar may have any number of external connection portions 206. The external connection portions 206 may be coupled to power devices of an equipment such as an inverter. An external connection portion 206 may include a hole through which a wire connecting the busbar to a power device may pass. The body of the busbar may have one or more bends or curves 210.

The entire busbar 201 may be made of a metal such a copper or a copper alloy which is electrically and thermally conductive. The electrically conductive busbar is used to transmit electric current from one power device to another within an assembly. The body 202 of the busbar may be coated with an electrically insulating material to reduce the possibility of short circuit upon contact of the body of the busbar with a grounding component of the assembly such as the heat sink. In this example, the body 202 of the busbar is coated with a dielectric powder material. The dielectric coating 210 may be of uniform thickness over the metal body 202. In one example, thickness of the dielectric coating 210 may be in the range of 0.1 and 1 mm. In another example, the thickness of the dielectric coating 210 may be 0.3 mm. Due to the thin coating of the dielectric powder, it is possible to improve packaging of the busbar (less space consumed due to decreased thickness). The powder coating may be applied to busbars of any shape and size and may be effectively used to coat bends and non-uniform sections of the body. In contrast to other insulating materials used to cover the body of a busbar such as insulating paper, powder coatings allow a higher design flexibility for irregular bends and shapes, which facilitate in optimizing packaging of the components of the inverter.

Due to potential usage of the busbar in medium and high voltage conditions, the dielectric strength of the coating 210 may be higher than a threshold strength to ensure electrical insulation of the coated body 202. In one example, the threshold strength may be in the range of 3000 to 4000 V/mm. In another example, the threshold strength may be 3500 V/mm. A higher than threshold dielectric strength of the coating ensures that there are no creepage paths for short circuits. FIG. 3 shows an example method for preparing a busbar with a dielectric coating and positioning the busbar inside an inverter.

Due to the dielectric powder coating on the entire body of the busbar, the body of the busbar may be thermally conductive while being electrically insulating making it possible to dissipate heat through the entire surface area of the body of the busbar.

In this way, the system of FIGS. 1 and 2A-2E provide for a system for an inverter, comprising: a metallic busbar with a surface area at least partially laminated with an electrically insulating, thermally conductive powder material; and a thermal interface material compressed in an interface of the busbar and a heat sink.

FIG. 3 shows an example method 300 for fabrication of a busbar (such as busbar 104 in FIG. 1 or busbar 201 in FIG. 2A) coated with a dielectric powder material. The method 300 may be employed to fabricate both AC and DC busbars.

At 302, the method 300 may include forming a metallic busbar based on a desired design. As an example, the busbar may be forged from copper or a copper alloy. The busbar may have a body and one or more external connection portions jutting out of the body. Due to high electrical conductivity of copper, the entire busbar may be electrically conductive. The external connection portions may be used to connect with other busbars or power devices. The body of the busbar may have bends or curvature along the surface.

At 304, areas of the busbar that is to remain electrically conductive may be masked. The areas that may not be coated with the electrically insulating material may include the external connection portions since the external connections are coupled to other conductive members of an assembly and electric current is desired to flow through the connections at all times. By masking such areas, during the subsequent coating process, these areas would not be coated with the dielectric powder which is electrically insulating, thereby allowing the surfaces of these areas to remain electrically conductive.

At 306, the unmasked portion of the busbar, such as the surface area of the body of the busbar, may be coated with a thermally conductive but electrically insulating powder material. In one example, the powder material may be an epoxy resin with high dielectric strength and dimensional stability at high temperatures over 300° C. One example of a commercial product used for the powder coating may be AkzoNobel Resicoat® EL4 HNE01R.

The dielectric powder material may be coated on a cleaned surface of the busbar via an electrostatic fluidized bed powder coating process. FIG. 4 shows a schematic 400 of an example setup for the electrostatic fluidized bed powder coating process.

The setup 400 may comprise a chamber 404 including an electrostatic grid 408 close to its base 413. A porous membrane 406 may be positioned within the chamber 404, above the electrostatic grid 408 to allow fluidizing air to be pumped into the chamber 404. An air pump may be coupled to the chamber and pressurized air may be supplied from the air pump to the chamber via an air passage 414. The air passage 414 may be coupled to the chamber 404 below each of the electrostatic grid 408 and the porous membrane 406. The pressurized air 416 may enter the top portion of the chamber via the porous membrane 406.

A fluidized powder (also referred herein as emulsion) 410 may occupy the chamber 404 above the porous membrane 406. The fluidized powder may include an emulsion of the dielectric powder to be used for coating the busbar in air. The electrostatic grid 408 may be negatively charged causing a cloud 412 of the powder material to form at the top surface of the emulsion 410. In this way, the powder material may form an electrostatic powder cloud 412 at the top portion of the chamber 404.

The part 426 to be coated with the powder material, such as the busbar, may hang from a conveyer belt 422. The conveyer belt 422 may move above the chamber 404 in the direction shown by the arrow 424. As the conveyer belt 422 moves, the part 426 may travel through the electrostatic powder cloud. While moving through the powder cloud, the powder material may be deposited uniformly on the part. The speed of the conveyer belt may be inversely proportional to the thickness of the powder coating deposited on the part 426, the thickness of the coating increasing with a decrease in speed of travel of the conveyer belt 422. Therefore, the speed of the conveyer belt may be adjusted based on the desired thickness of the dielectric coating on the busbar. In one example, thickness of the dielectric coating achieved via the electrostatic fluidized bed powder coating technique may be in the range of 0.1 and 3 mm.

Returning to FIG. 3, at 308, the busbar may be installed within a component such as a inverter system with a thermal material as interface between a heat sink and the busbar. During operation of the inverter, the busbar may be heated and thermal management of the busbar is desired to maintain power output of the inverter. The heat sink is proximal to the busbar and a cooling fluid flowing through the heat sink may remove heat from the busbar. In order to bolster the interface between the busbar and the heat sink, a thermal material is being used. Examples of thermal interface materials include silicone, reinforced silicone, reinforced polymer, etc. As an example, a sheet of the thermal material may be sandwiched between the body of the busbar and the heat sink. In one example, a thickness of the thermal material used as a sheet between the busbar and the heat sink may be in the range of 1 mm to 3 mm. By coating the body of the busbar with the dielectric powder material, it is possible to improve thermal conductivity of the busbar surface area. Heat from the busbar may be conducted through the dielectric coating and the thermal material to the heat sink.

In order to maintain contact between the busbar and the heat sink via the thermal material, at 310, a pressure part may be installed to remain in face sharing contact with the dielectric coated body of the busbar to compress the busbar against the thermal material. The pressure part may be a plate compressing the busbar against the thermal material and the heat sink. By using a pressure part, the contact between the busbar and the heat sink via the thermal material may remain robust without any space in between. By maintaining the contact at all times, improved heat conduction from the busbar to the heat sink may be facilitated.

In this way, by coating a body of a busbar with a dielectric powder material and installing the busbar within an assembly, such as an inverter, with a thermal material compressed in the interface of the busbar and a heat sink, heat transfer from the busbar to the heat sink may be improved. By improved thermal management of the busbar system, power concentration of the assembly may be improved.

In one example, a method for a high voltage busbar, comprises: forming a conductor into a shape of the busbar, coating unmasked areas of the busbar with a dielectric material to form a dielectric coated portion of the busbar, and compressing the dielectric coated portion of the busbar to a thermal interface material (TIM) attached to a heat sink. In the preceding example, additionally or optionally, the shape of the busbar includes a body and one or more external connection portions extending from the body, the busbar coupled to external components via the external connection portions. In any or all of the preceding examples, additionally or optionally, the unmasked areas includes the body of the busbar, the external connection portions being masked prior to the coating. In any or all of the preceding examples, additionally or optionally, the coating the unmasked areas is carried out via an electrostatic fluidized bed powder coating process with the busbar being coated by moving the busbar through an electrostatic powder cloud constituting the dielectric material. In any or all of the preceding examples, additionally or optionally, the electrostatic powder cloud is formed over an emulsion of electrically charged dielectric material in a powder form, the emulsion formed by flowing pressurized air through a fluidized powder contained in a chamber. In any or all of the preceding examples, additionally or optionally, the busbar is suspended from a conveyer belt and moved through the electrostatic powder cloud. In any or all of the preceding examples, additionally or optionally, a thickness of the coating is in a range of 0.1 mm and 1 mm. In any or all of the preceding examples, additionally or optionally, the dielectric material is an epoxy resin with a higher than threshold dielectric strength. In any or all of the preceding examples, additionally or optionally, the threshold dielectric strength is in a range of 3000 and 4000 V/mm. In any or all of the preceding examples, additionally or optionally, a block of the thermal interface material is compressed between the dielectric coated portion of the conductor and the heat sink via a pressure part. In any or all of the preceding examples, additionally or optionally, the method further comprising, attaching the busbar within an inverter of a vehicle propulsion system, the busbar conducting electric current between two power devices within the inverter. In any or all of the preceding examples, additionally or optionally, the busbar is one of an alternating current (AC) busbar and a direct current (DC) busbar.

Another example system for a busbar comprises: a body of the busbar including a coating of a thermally conducting dielectric powder material, the body in face sharing contact with a heat sink via a thermal interface material. In any preceding example, additionally or optionally, the busbar includes one or more uncoated external connection portions originating from the body. Any or all of the preceding examples further comprising, additionally or optionally, a pressure plate in face sharing contact with the body of the busbar, the pressure plate compressing the body of the busbar to the thermal interface material. In any or all of the preceding examples, additionally or optionally, each of the busbar and the heat sink are in contact with power devices, the body of the busbar dissipating heat to a cooling fluid flowing through the heat sink via the thermally conducting dielectric powder material and the thermal interface material. In any or all of the preceding examples, additionally or optionally, a thickness of the coating on the body is in a range of 0.2 mm and 0.5 mm.

In yet another example, a system, comprises: a metallic busbar with a surface area at least partially laminated with an electrically insulating, thermally conductive powder material; and a thermal interface material compressed in an interface of the busbar and a heat sink. In any preceding example, additionally or optionally, the thermal interface material is compressed via a pressure part positioned on the laminated surface area of the busbar. In any or all of the preceding examples, additionally or optionally, the powder material is a dielectric material including an epoxy resin.

Note, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a high voltage busbar, the method comprising:
   forming a conductor into a shape of the busbar;
   coating unmasked areas of the busbar with a thermally conductive dielectric powder material to form a dielectric coated portion of the busbar; and
   compressing the thermally conductive dielectric coated portion of the busbar to a thermal interface material (TIM) attached to a heat sink, the heat sink having a thickness greater than the TIM, wherein the TIM is only in direct contact with the thermally conductive dielectric coated portion of the busbar and the heat sink.

2. The method of claim 1, wherein the busbar includes a body and one or more external connection portions extending from the body, the busbar coupled to external components via the external connection portions.

3. The method of claim 2, wherein the unmasked areas include the body of the busbar, and wherein the external connection portions are masked prior to the coating.

4. The method of claim 1, wherein the coating the unmasked areas is carried out via an electrostatic fluidized bed powder coating process with the busbar being coated by moving the busbar through an electrostatic powder cloud constituting the dielectric powder material.

5. The method of claim 4, wherein the electrostatic powder cloud is formed over an emulsion of an electrically charged dielectric powder material, the emulsion formed by flowing pressurized air through a fluidized powder contained in a chamber.

6. The method of claim 4, wherein the busbar is suspended from a conveyer belt and moved through the electrostatic powder cloud.

7. The method of claim 1, wherein a thickness of the coating on the dielectric coated portion is in a range of 0.1 mm and 1 mm.

8. The method of claim 1, wherein the dielectric material is an epoxy resin with a dielectric strength above a threshold dielectric powder strength.

9. The method of claim 8, wherein the threshold dielectric strength is in a range of 3000 V/mm and 4000 V/mm.

10. The method of claim 1, wherein a block of the TIM is compressed between the dielectric coated portion of the conductor and the heat sink via a pressure part.

11. The method of claim 1, further comprising attaching the busbar within an inverter of a vehicle propulsion system, the busbar conducting electric current between two power devices within the inverter.

12. The method of claim 1, wherein the busbar is one of an alternating current (AC) busbar and a direct current (DC) busbar.

* * * * *